US009078161B2

(12) United States Patent
Hurtta et al.

(10) Patent No.: US 9,078,161 B2
(45) Date of Patent: Jul. 7, 2015

(54) METHOD AND APPARATUS CONFIGURED TO PROVIDE LOCAL BREAKOUT SERVICES WITH A SINGLE APN

(75) Inventors: Tuija Helena Hurtta, Espoo (FI); Mirko Schramm, Berlin (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 405 days.

(21) Appl. No.: 13/318,367

(22) PCT Filed: May 10, 2010

(86) PCT No.: PCT/EP2010/056356
§ 371 (c)(1),
(2), (4) Date: Nov. 1, 2011

(87) PCT Pub. No.: WO2010/128165
PCT Pub. Date: Nov. 11, 2010

(65) Prior Publication Data
US 2012/0057463 A1    Mar. 8, 2012

Related U.S. Application Data

(60) Provisional application No. 61/213,133, filed on May 8, 2009.

(51) Int. Cl.
*H04W 28/08*  (2009.01)
*H04L 12/54*  (2013.01)
*H04W 8/12*  (2009.01)

(52) U.S. Cl.
CPC ........... *H04W 28/08* (2013.01); *H04L 12/5692* (2013.01); *H04L 12/5695* (2013.01); *H04W 8/12* (2013.01)

(58) Field of Classification Search
None
See application file for complete search history.

(56) References Cited

U.S. PATENT DOCUMENTS 6,600,732 B1 *  7/2003  Sevanto et al. ................ 370/349
2008/0259873 A1 * 10/2008  Ahmavaara et al. .......... 370/331
(Continued)

FOREIGN PATENT DOCUMENTS

KR    100708363 B1    4/2007
WO   2007/057738 A2    5/2007
(Continued)

OTHER PUBLICATIONS

International Search Report and Written Opinion corresponding to International Application No. PCT/EP2010/056356 dated Nov. 5, 2010.
(Continued)

*Primary Examiner* — Brian Roberts
(74) *Attorney, Agent, or Firm* — Squire Patton Boggs (US) LLP

(57) ABSTRACT

A method, apparatus, computer program, and system is provided that includes handling traffic management in a communication network system. One example may include activating a communication link, obtaining traffic management rules to handle the traffic flow on the communication link, and transferring the traffic management rules to at least one network element configured to implement the traffic management rules. The traffic management rules are configured to perform traffic management by transferring at least a portion of the network traffic to a different communication network.

14 Claims, 5 Drawing Sheets

(56) References Cited

U.S. PATENT DOCUMENTS

2009/0232019 A1* 9/2009 Gupta et al. .................. 370/252
2009/0318147 A1 12/2009 Zhang et al.

FOREIGN PATENT DOCUMENTS

WO 2008/020787 A1 2/2008
WO 2008/144991 A1 12/2008

OTHER PUBLICATIONS

"Generic Policy Control for Local Breakout," IP Com Journal, IP Com Inc., Nov. 17, 2009, XP013135390, pp. 1-11.
3GPP TS 23.060 V9.0.0 (Mar. 2009) Technical Specification 3rd Generation Partnership Project; Technical Specification Group Services and System Aspects; General Packet Radio Service (GPRS); Service description; Stage 2 (Release 9), 275 pages.
3GPP TS 23.401 V9.0.0 (Mar. 2009) Technical Specification 3rd Generation Partnership Project; Technical Specification Group Services and System Aspects; General Packet Radio Service (GPRS) enhancements for Evolved Universal Terrestrial Radio Access Network (E-UTRAN) access (Release 9), 225 pages.
3GPP TS 23.203 V8.0.0 (Dec. 2007) 3rd Generation Partnership Project; Technical Specification Group Services and System Aspects; Policy and charging control architecture (Release 8), 74 pages.
English translation of Office Action dated Apr. 29, 2014, issued in corresponding KR Application No. 10-2011-7029405.
Office Action dated Feb. 16, 2015, issued in corresponding CA Patent Application No. 2,761,056.

* cited by examiner

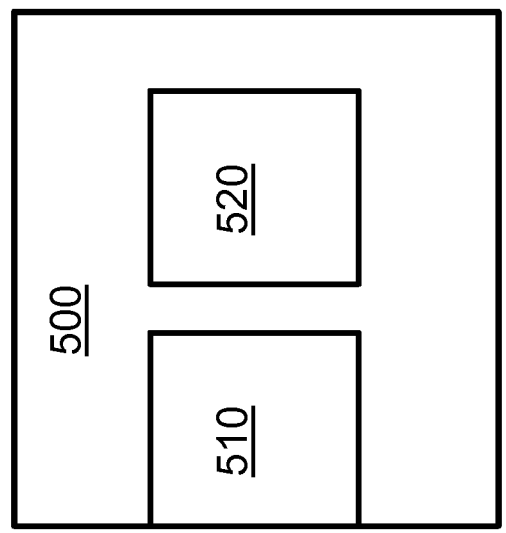

METHOD AND APPARATUS CONFIGURED TO PROVIDE LOCAL BREAKOUT SERVICES WITH A SINGLE APN

FIELD OF THE INVENTION

The present invention relates generally to communication systems, and particularly to third generation partnership project (3GPP) local breakouts. In particular, the present invention relates to a local breakout or traffic offload network implementation that is performed with a single access point name (APN).

DESCRIPTION OF THE RELATED ART

In a broadband data network, it is important to implement data handling procedures to ensure that network integrity is maintained. One example of a network data handling procedure may include reducing the amount of data traffic currently on a particular network. One way to offload the amount of data currently on a particular network may be to implement a local breakout, which is a mechanism which permits network traffic associated with a (home) network to become offloaded, or, at least shared with another (visited) network. Routing user traffic locally in non-roaming cases or routing user traffic in the visited network instead of forwarding user traffic through the home network in roaming cases may be a more cost effective way to offer access to local services or the Internet. In addition, routing the traffic toward the Internet at the visited network may avoid costly inter-operator data transport transactions.

Certain providers and operators of user equipment services may desire to offload the non-valuable or bulk traffic from their own network in order to achieve these cost savings and to simplify traffic management. This may be accomplished by offloading the bulk traffic to another network (i.e., a digital subscriber line (DSL) network). As noted above, offloading of traffic may be accomplished via the local breakout service. A local breakout may take place at various network elements (e.g. base stations, RNCs, femto elements or standalone elements located near these elements). As local breakout solutions continue to grow in their popularity and acceptance, it is likely that local breakout solution may continue to be introduced to the macro network and even the femto network.

In a single access point name (APN) type of configuration (e.g. an Internet APN), part of the network traffic may be non-valuable bulk traffic. In addition, part of the network traffic may be valuable or high priority traffic which the operator would prefer to be carried via the gateway GPRS support node and/or the PDN gateway (GGSN/PGW) so that deep packet inspection (DPI) functionality, or, other specific functionality (e.g. charging, quality assurance measures), may be performed for the network traffic.

However, not all APNs are subject to local breakout. It should be determined per APN if local breakout should be supported. In the current implementations, this knowledge is available only at the core network. In order to provide effective traffic separation for the local breakout, the network element supporting local breakout is required to know which traffic is subject to local breakout and which traffic must be carried via the GGSN/PGW.

In order to achieve this, policy enforcement procedures may be used to provide the network element supporting local breakout with the rules needed to handle effective traffic routing and local breakout procedures. For instance, such policy enforcement may be accomplished with either static policy charging and control (PCC) rules, or, with dynamic policy charging and control (PCC) rules. Static PCC rules may be simpler to implement, as those rules may be pre-configured in the network element that is supporting the local breakout. Conversely, the dynamic PCC rules may require ongoing access to a policy and charging rules function (PCRF).

SUMMARY OF THE INVENTION

It is an object of the invention to provide an effective traffic routing in a communication network. In particular, it is an object of the invention to provide a method, an apparatus and a computer program product by means of which effective routing of traffic in a communication network can be achieved. In addition, it is an object of the invention to provide dynamic traffic management rules to a network element supporting local breakout in a communication network.

These objects are achieved by the procedures defined in the attached claims.

In one embodiment of the present invention, a method may include handling traffic management in a communication network system. The method may include activating a communication link, obtaining traffic management rules to handle the traffic flow on the communication link, and transmitting the traffic management rules to at least one network element configured to implement the traffic management rules. The traffic management rules are configured to perform traffic management by transferring at least a portion of the network traffic to a different communication network.

The method may include that the communication link is a PDP context or default bearer.

The method may include that the transferring of the at least a portion of the network traffic is based on a local breakout operation.

The method may further include contacting a policy charging rate function (PCRF) of a network element to obtain the traffic management rules.

The method may further include using a Gx interface procedure to contact the PCRF network element.

The method may further include that the traffic management being performed via filters used to determine the traffic that is subject to a local breakout operation.

The method may also include that the filters are TFT filters.

The method may further include determining a network element responsible for the local breakout and sending to the network element APN information and local breakout information indicating which of the network elements is responsible for the local breakout traffic management.

In another embodiment of the present invention, an apparatus may include a processor configured to handle traffic management in a communication network system. The processor may perform activating a communication link and obtaining traffic management rules to handle the traffic flow on the communication link. The apparatus may also include a transmitter configured to transmit the traffic management rules to at least one network element configured to implement the traffic management rules. The traffic management rules are configured to perform traffic management by transferring at least a portion of the network traffic to a different communication network.

The apparatus may include that the communication link is a PDP context or default bearer.

The apparatus may include that the transferring of the at least a portion of the network traffic is based on a local breakout operation.

The apparatus may further provide contacting a policy and charging rules function (PCRF) of a network element to obtain the traffic management rules.

The apparatus may further include using a Gx interface procedure to contact the PCRF network element.

The apparatus may further include that the traffic management being performed via filters used to determine the traffic that is subject to a local breakout operation.

The apparatus may also include that the filters are TFT filters.

The apparatus may further include determining a network element responsible for the local breakout and sending to the network element APN information and local breakout information indicating which of the network elements is responsible for the local breakout traffic management.

Another embodiment of the present invention may include a computer readable medium comprising a computer program that when executed controls a processor to perform any of the operations of the other embodiments of the above-described example methods.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art. An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

BRIEF DESCRIPTION OF THE DRAWINGS

Further embodiments, details, advantages, and modifications of the present invention will become apparent from the following detailed description of the preferred embodiments, which is to be taken in conjunction with the accompanying drawings, wherein:

FIG. 5 illustrates an apparatus in accordance with an embodiment.

DETAILED DESCRIPTION

It will be readily understood that the components of the present invention, as generally described and illustrated in the figures herein, may be implemented in a wide variety of different configurations. Thus, the following detailed description of the embodiments of a method, apparatus, and system, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment of the present invention. Thus, appearances of the phrases "example embodiments," "in some embodiments," "in other embodiments," or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

In order to provide optimized performance and real-time services for customers, efficient routing of network traffic is required. For some services, network traffic may breakout locally. A local breakout may be allowed for some network traffic but not for other network traffic. A local breakout may be performed based on a particular access point name (APN), which is an identity of a network to which a mobile station, such as a user equipment, may be connected or may further include settings that are used for that connection. An APN may be selected manually by the user equipment at every session initiation process, or, may instead be pre-configured into the user equipment. In the case that the same application uses multiple IP addresses/APNs, automatic selection rules for selecting a particular APN may be employed by the user equipment.

Figure 1:
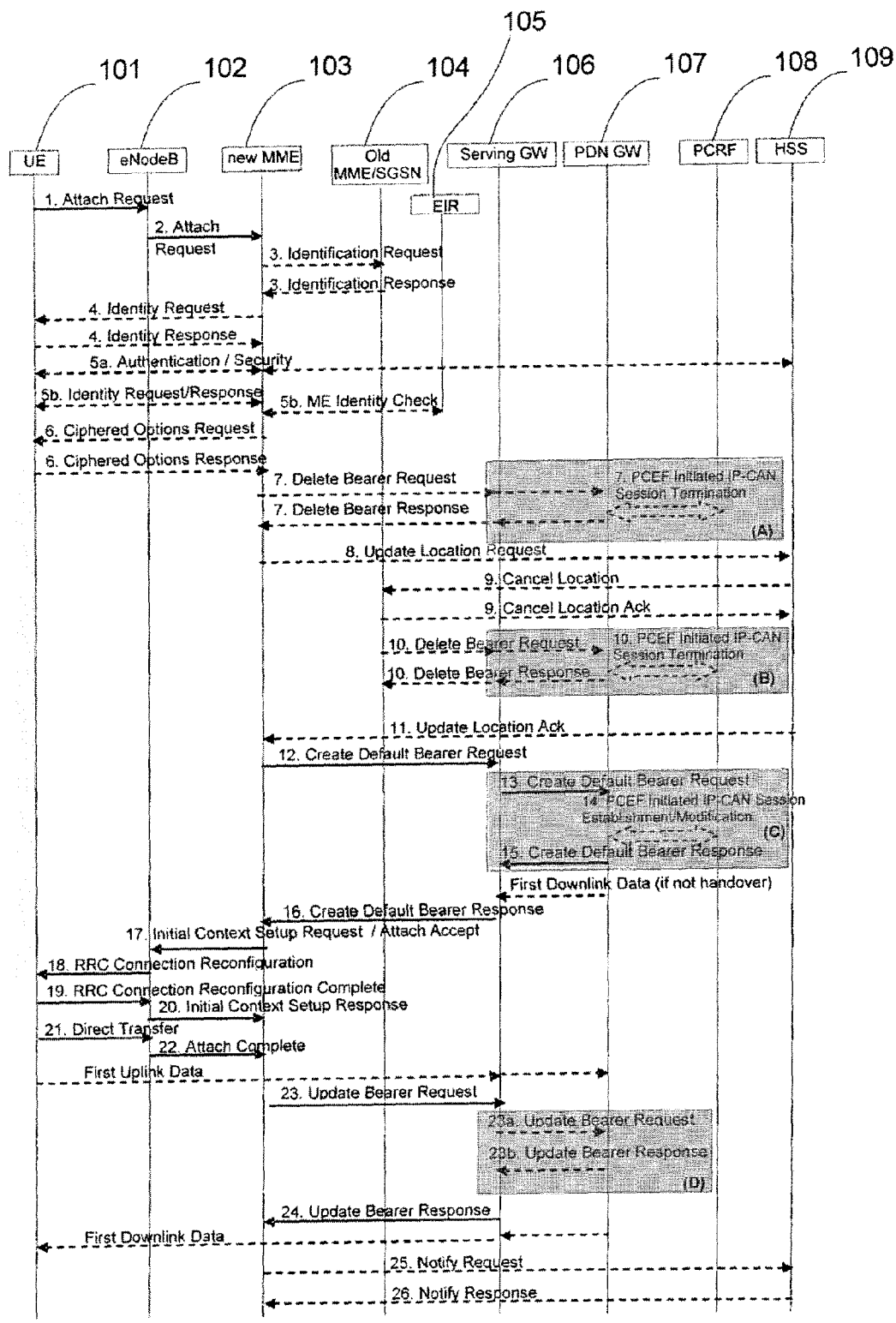
FIG. 1 illustrates a signaling diagram according to an embodiment.

To detail certain operations performed by the network elements of the networking system, a signaling flow in a long term evolution (LTE) communication procedure is illustrated in detail in FIG. 1, according to an embodiment.

Referring to FIG. 1, a user equipment 101 sends an attach request to a long term evolution (LTE) standard compatible base station eNodeB 102 at operation 1. The eNodeB 102 forwards the attach request to a new mobility management entity (MME) 103 at operation 2. Next, an identification request and response message pair is exchanged between the new MME 103 and the old MME/serving GPRS support node (SGSN) 104 at operation 3. The UE 101 and the new MME 103 may then exchange an identity request and response at operation 4. Then, an authentication/security message is made known to the network elements in the network system at operation 5a.

Continuing with the signaling diagram of FIG. 1, the identity request/response is distributed at operation 5b, along with a management entity (ME) identity check that includes network element equipment identity register (EIR) 105, which stores network identity information. A ciphered options request is then sent from the new MME 103 to the UE 101 and a response is returned at operation 6. The new MME 103 then initiates a delete bearer request message to the serving GW 106, which becomes part of a policy charging and enforcement function (PCEF) initiated internet protocol connectivity access network (IP-CAN) session termination procedure at operation 7, and, which is returned in a delete bearer response message. The location request update is provided from the new MME 103 to the home subscriber server (HSS) 109 at operation 8. This invokes the old MME/SGSN 104 to cancel its location and receive a corresponding acknowledgment (Ack) at operation 9.

Further continuing with the signaling diagram of FIG. 1, the old MME/SGSN 104 deletes a bearer request and receives a response at operation 10. Operation 10 is also part of a PCEF initiating IP-CAN session termination procedure. As may be viewed by the dotted-lined double arrow, the PDN GW 107 and the PCRF 108 are part of the session termination procedures (A and B). The HSS 109 then initiates an update location acknowledgment (ack) message to the new MME 103 at operation 11, which creates a default bearer request. The default bearer request is sent to the serving GW 106 at operation 12. The serving GW 106 creates a default bearer request and sends it to the PDN GW 107 at operation 13. This initiates a PCEF initiated IP-CAN session establishment/modification procedure between the PDN GW 107 and the PCRF 108 at operation 14. The PDN GW 107 then sends a create default bearer response to the serving GW 106 at operation 15 (procedure C). This provides the ability for a first downlink data to be exchanged between the PDN GW 107 and the serving GW 106, provided that a handover has not occurred.

Yet further continuing with the signaling diagram of FIG. 1, the serving GW 106 creates a default bearer response with the new MME 103 at operation 16. Next, an initial context setup request/attach accept message is sent from the new MME 103 to the eNodeB 102 at operation 17. The eNodeB 102 then sends a RRC connection reconfiguration to the UE 101 at operation 18, which returns with a RRC connection reconfiguration complete message at operation 19. The eNodeB 102 then provides an initial context setup response to the new MME 103 at operation 20. The UE 101 then provides a direct transfer to eNodeB 102 at operation 21, which, then provides an attach complete message to the new MME 103 at operation 22. First uplink data may be sent from the UE 101 to the serving GW 106 and/or the PDN GW 107. The new MME 103 may send a message to update a bearer request to the serving GW 106 at operation 23. As a result, an update bearer request and response are exchanged between the serving GW 106 and the PDN GW 107 at operation 23a (procedure D). The update bearer response is then sent from the serving GW 106 to the new MME 103 at operation 24. First downlink data may be sent from the PDN GW 107 to the serving GW 106, and, onward to the UE 101. Finally, a notify request is sent from the new MME 103 to the HSS 109 so that the records may be updated at operation 25, which, in turn, is answered by a notify response at operation 26.

This detailed example of the signaling diagram of FIG. 1 illustrates the attach procedure for a long term evolution (LTE) communication procedure. In operation 13, the PDN GW or PGW 106 may determine that the APN is subject to a local breakout. When the PGW 106 contacts the PCRF 108, the PGW 106 may send an LBO indication to the PCRF 108 (not shown). As an alternative, the PCRF 108 may itself also determine that the APN is subject to a local breakout. Additionally, the PCRF 108 may provide the LBO PCC rules to the PGW 106 during operation 14 (not shown). The PGW 106 may forward these received LBO PCC rules to the LBO network element during operations 15-17 (not shown). As additional information, the PGW 106 may also send the PCRF 108 address to the LBO network element.

Figure 2:
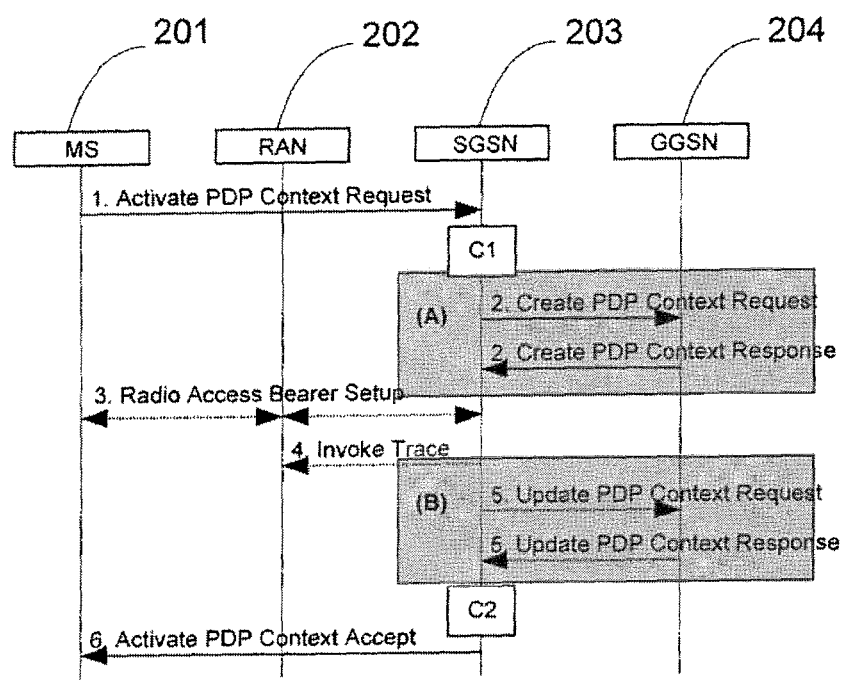
FIG. 2 illustrates another signaling diagram according to an embodiment.

Another embodiment is described with reference to the signaling diagram in a 3 G communication system illustrated in FIG. 2. Referring to FIG. 2, a MS 201 initiates an activate PDP context request message to SGSN 203 at operation 1. The SGSN 203 creates a PDP context request, and the GGSN 204 creates a PDP context response at operation 2 (procedure A). At operation 3, a radio access bearer setup message is propagated through the MS 201, the RAN 202 and the SGSN 203. The SGSN 203 then invokes a trace procedure at operation 4. Next, an update PDP context request message is sent from SGSN 203 to GGSN 204 and an update PDP context response is received at the SGSN 203 from the GGSN 204 at operation 5 (procedure B). The SGSN 203 then transmits an activate PDP context accept message to the MS 201 to confirm the active PDP context establishment at operation 6.

FIG. 2 illustrates the primary operations of a PDP context activation procedure for a 3 G communication system.

It is noted that specific GGSN 204 and PCRF signaling is not illustrated in FIG. 2. However, these types of signaling may take place when the GGSN receives a create PDP context request (assuming normal Gx procedures communication procedures are implemented). For instance, referring to operation 4 of FIG. 2, the GGSN 204 may determine that the APN is subject to a local breakout. For example, when the GGSN 204 contacts the PCRF, the GGSN 204 may send an LBO indication to the PCRF indicating information regarding the APN responsible for conducting an LBO operation. As an alternative, the PCRF may itself also determine that the APN is subject to a LBO operation.

In another example, the PCRF may provide LBO PCC rules to the GGSN 204. The GGSN 204 may forward these LBO PCC rules to the LBO element, which may be part of operations 2 and 3 of FIG. 2 (not shown). Also, as for additional information, the PGW may also send the PCRF address to the LBO network element (not shown).

All APNs in a system network are not configured to support the local breakout. One possibility to determining which APNs are allowed to participate in the breakout may be to determine whether local breakout should be supported on a per APN basis (i.e., locally at the APN itself). This provides increased flexibility rather than relying solely on the core network to provide the APN specific information. Below are three example implementations to determining the APNs which are responsible to handle the local breakout procedures.

According to one embodiment, when a primary packet data protocol (PDP) context/default bearer is activated, the core network may know whether the APN is subject to local breakout. The knowledge of whether the APN is subject to local breakout may be handled by the network GGSN/PGW or the PCRF.

Figure 3:
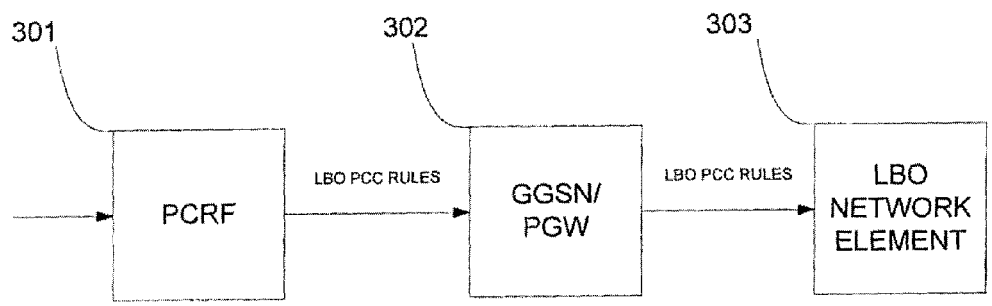
FIG. 3 illustrates an example network diagram according to an embodiment.

Such a configuration is illustrated in FIG. 3, according to an embodiment of the present invention. Referring to FIG. 3, at a primary PDP context/default bearer creation procedure, the PCRF may be contacted by sending a message from any of the network elements of the network system to the PCRF. In response, the PCRF may provide local breakout (LBO) related policy charging and control (PCC) rules, which are referred to as LBO PCC rules. For example, the PCRF may send the rules to the GGSN/PGW 302. The GGSN/PGW 302 may, in turn, send these LBO PCC rules towards the network element 303 supporting the local breakout (LBO network element). Examples of the LBO network element 303 may include a base station, radio network controller (RNC) or femto network element. The LBO PCC rules may contain service data flow filters that are used to detect traffic which is subject to local breakout. The filters provide the information necessary to separate the network traffic subject to the local breakout from the other network traffic.

In this example, updating the LBO PCC rules may be performed by the GGSN/PGW 302 without including other network elements in the updating procedure. This example may be especially suitable for handling the LBO procedure, especially if it is possible to create the LBO PCC rules at the onset of the primary PDP context/default bearer activation, and, if no further updating procedures are required.

According to another embodiment, instead of sending the LBO PCC rules (as discussed in the first example embodiment), the GGSN/PGW 302 may send the designated APN information and an LBO indication towards the LBO network element so that no rule interpretation at the LBO network element is necessary. The GGSN/PGW may send such information to the LBO network element via the SGSN. When the LBO network element receives the APN and LBO indication, it can contact the PCRF 301 itself using Gx interfacing and signaling procedures. As additional information, the GGSN/PGW 302 may also send the PCRF 301 address towards the LBO network element.

In this example, updating the LBO PCC rules is accomplished with Gx interfacing and signaling procedures. Additional network elements are not necessarily involved in the updating procedures, thus reducing the complexity and overhead associated with an updating procedure. Additionally, in this example the GGSN/PGW 302 and/or the PCRF 301 are the network elements which determine that the APN is subject to a local breakout. It should be noted that this may also be performed by the SGSN/MME 104 or new MME 103 (See FIG. 1), but, requires that APN specific information is pre-configured with the SGSN/MME 104 or new MME 103. In this case, the SGSN/MME 104 or new MME 103 may send the designated APN information and an LBO indication towards the LBO network element.

In another example embodiment, the LBO network element may also determine itself whether the APN is subject to a local breakout. This option may require the LBO network element to perform snooping of the APN from session management signaling, or, obtaining the APN from the SGSN/MME 104 or new MME 103. It should be noted that in case of an LTE configuration, the APN information may not be available in signaling coming from the UE 101 but may be determined by the MME 103. This option may also require that APN specific information is pre-configured to the LBO network element so that the LBO network element knows which APNs are subject to a local breakout. The LBO network element may then contact the PCRF 108 or 301 with Gx interfacing and signaling procedures for PCC rules, which are dynamically updated and distributed based on changes in the network configuration. Furthermore, in this example, updating the LBO PCC rules may be performed with Gx interfacing and signaling procedures without the need for additional network elements being involved in the updating procedure.

The various embodiments described above assume certain minor changes to existing 3G and LTE-based procedures. An alternative approach may be to introduce more changes to the signaling procedures, especially from the perspective of the SGSN/MME 104 or new MME 103 (Referring to FIGS. 1 and 3). For example, a gateway (not shown) may be located as part or the whole of the LBO network element 303, and the SGSN/MME 104 or new MME 103 could communicate with the LBO network element in a similar way as with the GGSN/PGW 107. As an example of an additional change in the 3G and/or LTE-based procedures, at a primary PDP context/default bearer activation procedure, the SGSN/MME 104 or new MME 103 may trigger PDP context/default bearer signaling towards the GGSN/PGW 107 or 302 and also towards the gateway in the LBO network element 303. Updating the primary PDP context/default bearer may be more complicated than any of updating procedures described by the various embodiments described above.

Implementing a single APN LBO may provide an optimized network configuration especially to offload traffic for a macro cell LBO, and to support all UEs operating in the present network system. Other outcomes from using a single APN LBO may include the ability to differentiate inside an application (i.e., a web browser) to send only some limited information to an operator and other information directly to the Internet.

Providing information to the LBO network element may enable a differentiated treatment of data traffic inside of a single PDP context/bearer without the need to use a PCC function. Instead, the PDP context/evolved packet system (EPS) bearer signaling may be used directly to forward the LBO network element information by reusing/enhancing the TFT system. Such a configuration is normally only used between the PGW/SGW and the UE to control which part of the user traffic must take which bearer.

Similarly, the LBO network element may be controlled to designate which portion of the traffic of the bearer should be forwarded to the PGW, while the other traffic portion is supposed to take the LBO path. To provide these traffic details to the LBO network element, the TFT packet filters may be flagged, or, specific value ranges for the respective filter identifier could be applied. Alternatively, a second independent set of TFT packet filters could be sent designating a different portion of network traffic. In summary, PCC functions may provide information to the PGW/SGW about whether a service flow needs to be forwarded to the PGW or not based on PCC or QoS rules. The PGW/SGW may build the TFT for the bearer and forward that information to the LBO network element via a TFT information element. Such an operation may be performed by enhancing the encoding of the existing TFT information or by adding a new set of TFT information.

Figure 4:
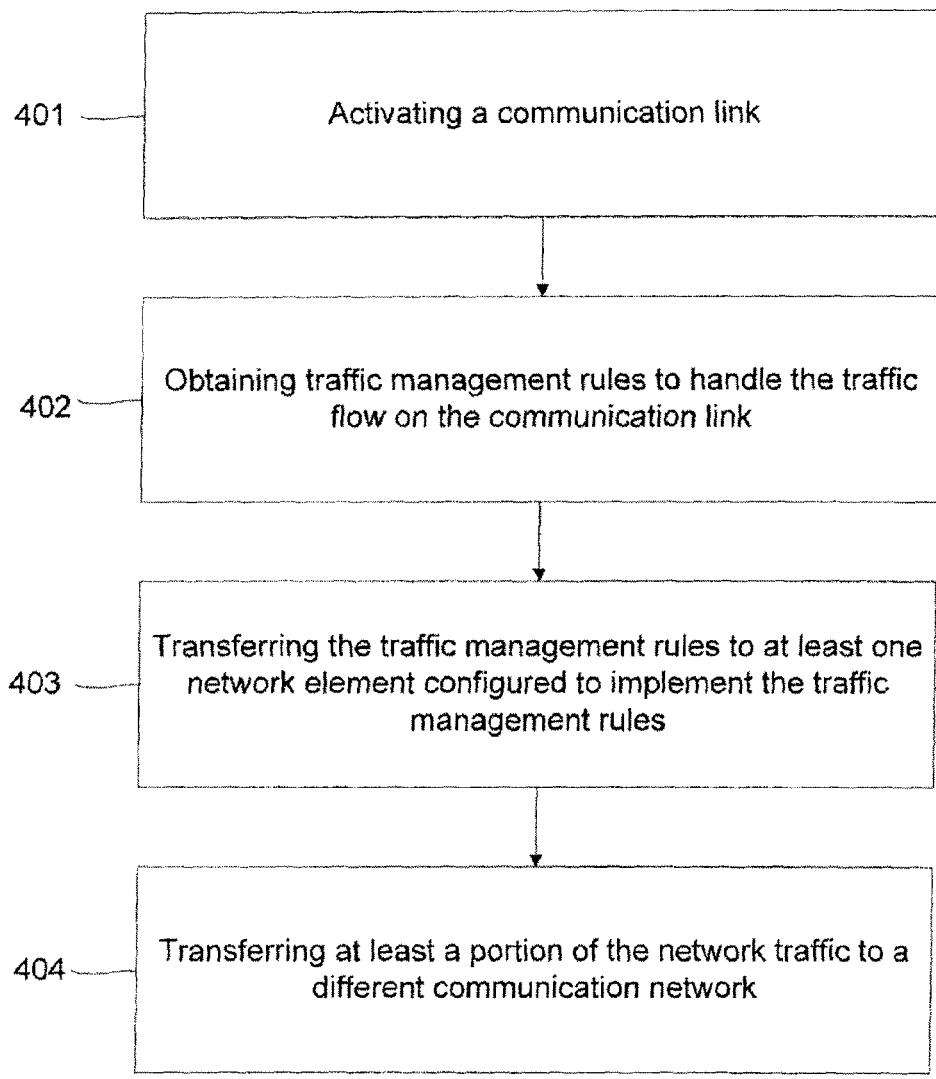
FIG. 4 illustrates a flow diagram, in accordance with an embodiment.

FIG. 4 illustrates a method according to an embodiment. Referring to FIG. 4, operation 401 provides activating a communication link. Next, operation 402 provides obtaining traffic management rules to handle the traffic flow on the communication link. In addition, operation 403 provides transferring the traffic management rules to at least one network element configured to implement the traffic management rules. Operation 404 provides transferring at least a portion of the network traffic to a different communication network.

FIG. 5 illustrates an apparatus 500 in accordance with an embodiment comprising a transmitter 510 and a processor 520.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

The invention claimed is:

1. A method comprising:
    using access point names on a per access point name basis in a determination to determine whether traffic offload should be supported and to determine a network element responsible for traffic offload; and sending to the network element information containing an access point name used in the determination.

2. The method in claim 1 further comprises sending a further information to the network element, said further information containing the address of a further network element.

3. The method of claim 2 further comprises contacting the further network element to obtain traffic management rules.

4. The method of claim 3, wherein contacting the further network element is through Gx interface.

5. The method of claim 2, wherein the further network element is a policy charging and rules function.

6. The method of claim 1, further comprising activating a communication link by setting up of a packet data protocol (PDP) context or default bearer.

7. The method of claim 1, wherein traffic management rules determine traffic to be subjected to traffic offload.

8. The method of claim 7, further comprising contacting a further network element to obtain the traffic management rules.

9. The method of claim 8, wherein the further network element comprises a policy and charging rules function (PCRF).

10. The method of claim 1, wherein traffic management is performed via filters to determine traffic that is subject to traffic offload.

11. The method of claim 10, wherein the filters comprise traffic flow template (TFT) filters.

12. A computer program product, embodied on a non-transitory computer readable medium, comprising code configured to control a processor to perform the steps of claim 8 when loaded into a memory of a computer.

13. An apparatus comprising:
   a processor configured to use access point names on a per access point name basis to determine whether traffic offload should be supported and, in a determination, to determine at least one network element responsible for traffic offload;
   a transmitter configured to transmit information containing an access point name used in the determination; and
   a processor configured to use traffic management rules to perform traffic offload by transferring at least a portion of network traffic to a different communication network.

14. The apparatus of claim 13, wherein the transmitter is further configured to transmit the address of a further network element responsible for traffic management rules.

* * * * *